United States Patent Office 3,551,572
Patented Dec. 29, 1970

---

3,551,572
METHODS AND COMPOSITION FOR TREATING ASTHMA
Arthur Hedley Wragg, Ashlands, Middlewich Road, Middlewich, England
No Drawing. Continuation-in-part of application Ser. No. 266,036, Mar. 18, 1963. This application Oct. 21, 1966, Ser. No. 588,322
Claims priority, application Great Britain, Apr. 2, 1966, 14,730/66
Int. Cl. A61k 27/00
U.S. Cl. 424—278                            12 Claims

ABSTRACT OF THE DISCLOSURE

There are disclosed pharmaceutical compositions comprising a pharmaceutical carrier or diluent together with a chromone derivative selected from chromone derivatives of the formulae:

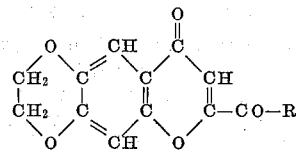

and

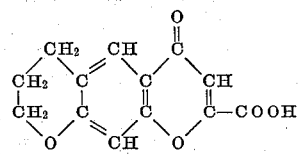

and salts, esters and amides thereof, wherein R is a hydroxy group or the radical —NH—$R^1$—COOH wherein $R^1$ is a straight or branched lower alkylene chain (for example a methylene, ethylene, propylene or isopropylene chain). The compositions are disclosed to inhibit the release and/or action of toxic products which arise from the combination of certain types of antibody and specific antigen. Specifically, the compositions are of value in the prophylactic treatment of asthma.

---

This application is a continuation-in-part of copending application Ser. No. 226,036, filed Mar. 18, 1963, now U.S. Pat. No. 3,291,811.

The present invention relates to chromone derivatives and to pharmaceutical compositions containing chromone derivatives.

It has now been found that certain chromone derivatives, as hereinafter defined, possess activity as inhibitors of the antigen-antibody reaction.

Accordingly, one embodiment of the present invention is for a pharmaceutical composition comprising a pharmaceutical carrier or diluent together with a chromone derivative selected from chromone derivatives of the formulae:

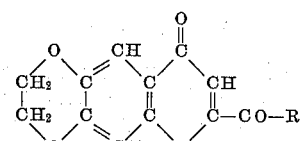

and

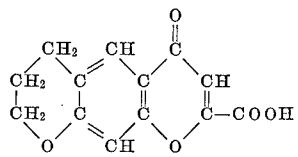

and salts, esters and amides thereof, wherein R is a hydroxy group or the radical —NH—$R^1$—COOH wherein $R^1$ is a straight or branched lower alkylene chain (for example a methylene, ethylene, propylene or isopropylene chain).

Salts of the chromone derivatives which may be mentioned are salts with physiologically acceptable cations, for example ammonium salts, metal salts such as alkali metal salts (e.g. sodium, potassium or lithium salts) and alkaline earth metal salts (e.g. magnesium and calcium salts) and salts with organic bases (e.g. amine salts such as piperidine and triethanolamine salts). As used in the claims, the term "ammonium salt" is to be understood as referring to a simple ammonium salt; that is, a salt made by reaction with ammonia.

Esters which may be mentioned are simple lower alkyl esters (e.g. methyl, ethyl, propyl, isopropyl, butyl, isobutyl and tert.butyl esters) and amides which may be mentioned are amides with lower alkylamines such as methylamine, ethylamine, propylamine, isopropylamine, butylamine, etc.

The chromone derivatives employed in the compositions according to the invention have been found to inhibit the release and/or action of toxic products which arise from the combination of certain types of antibody and specific antigen, e.g. the combination of reaginic antibody with specific antigen. In man, it has been found that both subjective and objective changes which result from the inhalation of specific antigen by sensitized subjects are inhibited by prior administration of the chromone derivatives. Thus, the compositions are of value in the prophylactic treatment of asthma.

The nature of the composition and the pharmaceutical carrier or diluent will, of course, depend upon the desired route of administration, i.e. orally, parenterally or by inhalation.

In general, for the prophylactic treatment of asthma, the composition will be in a form suitable for adminstration by inhalation. Thus the composition may comprise a suspension or solution of the active ingredient in water for administration by means of a conventional nebulizer. Alternatively the compositions may comprise a suspension or solution of the active ingredient in a conventional liquified propellant, such as dichlorodifluoromethane or chlorotrifluoroethane, to form a so-called "aerosol" composition to be administered from a pressurized container. The compositions may also comprise the solid active ingredient diluted with a solid diluent, e.g. lactose, for administration from a powder inhalation device.

The pharmaceutical compositions of the invention generally comprise a minor proportion of active chromone ingredient and a major proportion of carrier or diluent. Thus, for example, the solutions for administration by a conventional nebulizer will comprise a dilute solution, e.g. containing up to about 10% of the active ingredient in sterile water, and compositions comprising suspensions or solutions in pressurised propellants will contain, for example, about 2–5% of the active ingredient. However, where the composition comprises the solid active ingredient diluted with a solid diluent, the diluent may be present in less, equal or greater amount than the solid active ingredient, for example the diluent may be present in an amount of from 50 to 150% by weight of the solid active ingredient.

The invention also includes within its scope a method of inhibiting the effects of the antigen-antibody reaction which comprises the prior application to the area of the antigen-antibody mechanism a therapeutically effective amount of a chromone derivative as defined above, preferably in the form of a salt.

According to a particular embodiment, the invention is for a method of relieving or preventing allergic airway obstruction which comprises administering to the patient a therapeutically effective amount (e.g. 1–100 mg.) at suitable intervals, of a chromone derivative as defined above, particularly in the form of a salt.

Certain of the chromone derivatives described above are new compounds.

According to a further feature of the invention, therefore, there are provided as new compounds, chromone derivatives of the formula:

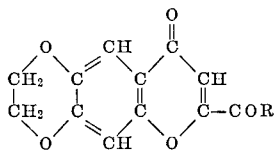

and salts, esters and amides thereof, wherein R has the meaning defined above.

These compounds may be prepared from 6-hydroxyl-benzo-1,4-dioxan (described by Heertjes et al., J. Chem. Soc. 1957, pp. 3445) by acetylation, to give 6-acetoxy-benzo-1,4-dioxan, followed by Fries rearrangement of 6-acetoxybenzo - 1,4 - dioxan, to 6 - acetyl - 7 - hydroxybenzo - 1,4 - dioxan, condensation of 6 - acetyl - 7 - hydroxybenzo-1,4-dioxan, with diethyl oxalate to give 6-(beta-ethoxycarbonyl - beta - oxypropionyl)-7-hydroxybenzo - 1,4 - dioxan, and cyclisation of 6 - (beta-ethoxycarbonyl - beta - oxypropionyl) - 7 - hydroxybenzo-1,4-dioxan by refluxing with glacial acetic acid and hydrochloric acid to give 6,7-ethylenedioxy chromone-2-carboxylic acid, which, if required, may be converted by convention methods to the corresponding metal salts, ammonium salt, or esters.

The chromone derivatives in which R is a carboxyalkylamino group may be prepared by the treatment of a suitable reactive derivative of the acid of the formula:

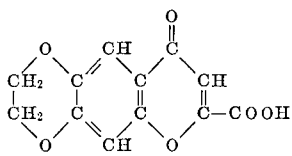

in organic solvent solution with the amino acid of the formula: $NH_2$—$R^1$—$COOH$, where $R^1$ has the significance indicated above, in the presence of a base.

Alternatively, the acid halide of the above chromone acid may be condensed with an ester of the amino acid and the resulting ester may be hydrolysed to the carboxylic acid, for example with hydrochloric acid in acetic acid.

The following examples are given to illustrate the present invention. All parts are by weight unless otherwise stated.

EXAMPLE 1

(a) 6-acetoxybenzo-1,4-dioxan

A solution of 6-hydroxybenzo-1,4-dioxan (35 g.) in glacial acetic acid (50 ml.) was treated with acetyl chloride (20 g.). After 10 minutes standing at room temperature and 30 minutes heating on a steam bath, the mixture was cooled and quenched with water (250 ml.). The product was extracted with three 80 ml. portions of ether, and the combined ethereal solution was washed with an excess of dilute sodium bicarbonate solution. Drying with anhydrous sodium sulphate and removal of the solvent by distillation gave 6-acetoxy- benzo-1,4-dioxen (43 g.) as a pale yellow oil, which was used without purification for the preparation of 6-acetyl-7-hydroxybenzo-1,4-dioxan.

Found: equivalent weight by saponification: 195. $C_{10}H_{10}O_4$ requires: 194%.

(b) 6-acetyl-7-hydroxybenzo-1,4-dioxan

To a suspension of anhydrous aluminium chloride (33.4 g.) in dry carbon disulphide (500 ml.) was added 6-acetoxy-benzo-1,4-dioxan (38.8 g.) and the mixture was refluxed for one hour. After distilling off the solvent, the remaining yellow frothy solid was heated at 140° C. for 1 hour in an oil bath. After cooling, the complex was decomposed with water and ice, and the resultant yellow solid was filtered off, washed with water (approx. 500 ml.) and dried under vacuum over phosphorus pentoxide. The crude product (37 g.) was recrystallized twice from ethanol to give 6-acetyl-7-hydroxybenzo-1,4-dioxan (29 g.) as a very pale yellow crystalline solid; melting point 145–146° C.

Found: C, 61.7%; H, 5.0%. $C_{10}H_{10}O_4$ requires: C, 61.9%; H, 5.2%.

(c) 6-(beta-ethoxycarbonyl-beta-oxypropionyl)-7-hydroxybenzo-1,4-dioxan

An ethanolic solution of sodium ethoxide prepared from sodium (7.57 g.) and ethanol (150 ml.) was stirred at 40° C. and to it was added a solution of 6-acetyl-7-hydroxybenzo-1,4-dioxan (13.6 g.) in diethyl oxalate (72 g.). The mixture was refluxed for 30 minutes, during which time a bright orange coloured solid separated, and the mixture became a thick paste. After cooling, water (500 ml.) and glacial acetic acid (40 ml.) was added, and the mixture was extracted three times with 100 ml. portions of chloroform. The extracts were washed with an excess of dilute sodium bicarbonate solution, dried over anhydrous sodium sulphate, and the solvent removed by distillation.

Any remaining diethyl oxalate was distilled off under vacuum. The residue was lixivated with 50 ml. of a 50:50 mixture of diethyl ether and light petroleum (boiling point 40–60° C.) and dried at 60° C. Recrystallization of the pale orange coloured solid remaining (20 g.) melting point 113–115° C., from a small volume of methanol, gave 6 - (beta - ethoxycarbonyl - beta - oxypropionyl)-7-hydroxybenzo-1,4-dioxan, as a pale cream solid (18 g.).

Found: C, 57.0%; H, 5.0%. $C_{14}H_{14}O_7$ requires: C, 57.2%; H, 4.8%.

(d) 6,7-ethylenedioxychromone-2-carboxylic acid

A solution of 6-(beta-ethoxycarbonyl-beta-oxypropionyl)-7-hydroxybenzo-1,4-dioxan (17.6 g.) in a mixture of glacial acetic acid (130 ml.) and concentrated hydrochloric acid (16 g.) was refluxed for 3½ hours. The white solid which separated out was filtered off, washed with about 10 ml. cold glacial acetic acid and redissolved in a slight excess of dilute sodium hydroxide solution. After decolourising with charcoal the solution was acidified whilst being vigorously stirred, and the finely divided solid was separated by centrifugation, washed twice with water (200 ml. each wash), twice with methanol (200 ml. each wash) and twice with ether (200 ml. each wash). After drying at 100° C., 6,7-ethylenedioxychromone-2-carboxylic acid (13.7 g.) was obtained as a pale yellow powder, melting point 310° C. (decomposition).

Found: C, 57.9%; H, 3.5%. $C_{12}H_8O_6$ requires: C, 58.1%; H, 3.23%.

EXAMPLE 2

2.48 parts of 6,7-ethylenedioxychromone-2-carboxylic acid were suspended in 100 parts dry dioxan and warmed with an excess of triethylamine until all were dissolved. The excess of amine was distilled off in vacuo and a further 100 parts of dioxan and 100 parts of toluene were added. The solution was cooled to 0° C. and 1.09 parts of ethyl chloroformate in a little dioxan were added. After the solution had been shaken for 15 minutes at 0° C. a fine white precipitate formed. A solution of 0.77 part of glycine in 10.2 parts of N sodium hydroxide was added and the mixture shaken at 0° C. for 30 minutes. An oily precipitate formed slowly from the initially clear brown solution. After the addition of excess of potassium bicarbonate solution the precipitate dissolved and the solution was evaporated to 250 millilitres, charcoaled, and acidified with concentrated hydrochloric acid. The fine precipitate which formed was filtered off, washed with water and recrystallized from ethanol to give 1.8 parts of 2-carboxymethylaminocarbonyl, 6,7-ethylenedioxychromone as a fine yellow powder, melting point 262–265° C. with decomposition.

Analysis. Found: C, 54.8%; H, 3.67%. $C_{14}H_{11}NO_7$ requires: C, 55.07%; H, 3.64%.

This was converted to its sodium salt as in Example 1.

EXAMPLE 3

The clinical evaluation of 6,7-ethylenedioxy-chromone-2-carboxylic acid as the sodium salt (Compound A), 2-carboxymethylaminocarbonyl - 6,7 - ethylenedioxychromone as the sodium salt (Compound B) and 5',6'-dihydropyrano(2',3',7,6)chromone-2-carboxylic acid as its sodium salt (Compound C) was based on the antigen inhalation provocation test. The human volunteers selected for test purposes suffered from specific allergic asthma. In these subjects an asthma attack normally followed the inhalation of an antigen to which they were specifically sensitive. The degree of asthma provoked by this method can be measured by repeated estimation of the increase of air way resistance.

A suitably designed spirometer was used to measure the forced expiratory volume at one second ($F.E.V._{1.0}$) hence the changes in air way resistance. The anti-allergic activity of a compound is estimated from the difference between the maximum percent ($F.E.V._{1.0}$) reduction following control and test provocations after drug administration conducted under identical experimental conditions.

The results of tests are expressed as percent protection according to the formula:

$$\% \text{ protection} = 100 \times \left| \frac{\text{Av. max. } \% \text{ F.E.V.}_{1.0} \text{ fall control shock} - \text{Max. } \% \text{ F.E.V.}_{1.0} \text{ fall test shock}}{\text{Av. max. } \% \text{ F.E.V.}_{1.0} \text{ fall control shock}} \right|$$

With this test procedure Compound B when inhaled as a 0.5% aerosol (estimated dose inhaled=0.1 mg.) afforded approximately 70% protection when administered 10 minutes before the antigen. Compounds A and C when inhaled as a 5% aerosol afforded approximately 70 and 60% protection respectively when administered 60 minutes before the antigen. Antihistamines, such as for example mepyramine, afforded less than 10% protection under similar conditions or following maximal clinical dosage by oral or intramuscular routes.

I claim:

1. A pharmaceutical composition comprising a pharmaceutical carrier together with an antiasthma therapeutically effective amount of a member selected from the group consisting of chromone derivatives of the formulae:

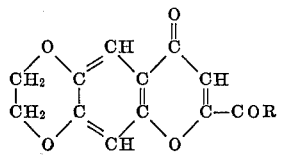

and

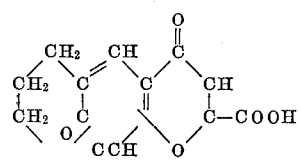

and physiologically acceptable salts, lower alkyl esters and amides with lower alkyl amines thereof, wherein said lower alkyl groups have 1 to 4 carbon atoms, and wherein R is a member selected from the group consisting of hydroxy and —NH—$R^1$—COOH, in which $R^1$ is a member selected from the group consisting of straight and branched chain lower alkylene.

2. A composition according to claim 1 wherein the chromone derivative is in the form of a physiologically acceptable salt.

3. A composition according to claim 2 wherein the chromone derivative is in the form of an ammonium salt.

4. A composition according to claim 2 wherein the chromone derivative is in the form of an alkali metal salt.

5. A composition according to claim 2 wherein the chromone derivative is in the form of an alkaline earth metal salt.

6. A composition according to claim 1 containing a major proportion of pharmaceutical carrier and a minor proportion of chromone derivative.

7. A composition according to claim 6 comprising a solution or suspension of the active chromone derivative in water.

8. A composition according to claim 6 comprising a solution or suspension of the active chromone derivative in a liquified aerosol propellant.

9. A composition according to claim 6 comprising the solid active chromone derivative diluted with a solid pharmaceutical diluent.

10. A method for the prophylactic treatment of allergic asthma which comprises the prior oral administration to a patient of a therapeutically effective amount of a chromone derivative selected from compounds of the formulae:

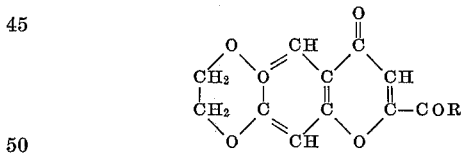

and

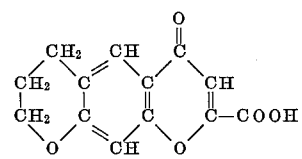

and physiologically acceptable salts, lower alkyl esters and amides with lower alkyl amines thereof, wherein said lower alkyl groups have 1 to 4 carbon atoms, and in which R is a member selected from the group consisting of hydroxy and —NH—$R^1$—COOH, in which $R^1$ is a member selected from the group consisting of straight and branched chain lower alkylene.

11. A method of relieving asthma which comprises the prior oral administration to the patient of a therapeutically effective amount of a chromone derivative selected from compounds of the formulae:

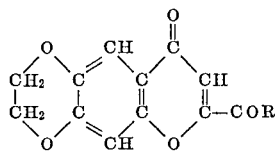

and

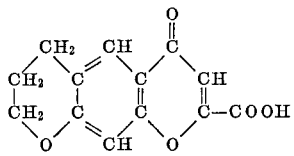

and physiologically acceptable salts, lower alkyl esters and amides with lower alkyl amines thereof, wherein said lower alkyl groups have 1 to 4 carbon atoms and, in which R is selected from the group consisting of hydroxy and $-NH-R^1-COOH$ in which $R^1$ is selected from the group consisting of straight and branched chain lower alkylene.

12. A method according to claim 11 wherein from 1 to 100 mg. of chromone derivative is employed.

References Cited
UNITED STATES PATENTS
3,291,811  12/1966  Wragg _____ 167—65E
3,322,795   5/1967  Wragg et al. _____ 167—65E ALBERT T. MEYERS, Primary Examiner J. D. GOLDBERG, Assistant Examiner U.S. Cl. X.R.

424—283